United States Patent
El Sherif et al.

(10) Patent No.: US 11,871,754 B1
(45) Date of Patent: Jan. 16, 2024

(54) **PROMOTING GROWTH, YIELD, AND SALINITY TOLERANCE OF *ACHILLEA FRAGRANTISSIMA***

(71) Applicant: KING FAISAL UNIVERSITY, Al-Ahsa (SA)

(72) Inventors: Fadia El Sherif, Al-Ahsa (SA); Salah Khattab, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/226,387

(22) Filed: Jul. 26, 2023

(51) Int. Cl.
    *A61K 36/00* (2006.01)
    *A01N 65/20* (2009.01)

(52) U.S. Cl.
    CPC .......... *A01N 65/20* (2013.01); *A01N 2300/00* (2013.01)

(58) Field of Classification Search
    CPC .................................................... A01N 65/20
    See application file for complete search history.

(56) References Cited

U.S. PATENT DOCUMENTS

| | | | |
|---|---|---|---|
| 9,271,503 B2 | 3/2016 | Mensah | |
| 2019/0030110 A1* | 1/2019 | Al Asoom | ........... A61K 9/0053 |

FOREIGN PATENT DOCUMENTS

| | | |
|---|---|---|
| CN | 115414404 A | 12/2022 |
| WO | 2023026856 A1 | 3/2023 |

OTHER PUBLICATIONS

Pramitasari et al, Characterization of physicochemical properties of butterfly pea flower petal (*Clitoria ternatea* L.) anthocyanin extract and freeze-dried powder). Agro Bali: Agricultural Journal (2022), vol. 5, No. 2, pp. 304-312 (Year: 2022).*

* cited by examiner

*Primary Examiner* — Qiuwen Mi
(74) *Attorney, Agent, or Firm* — Nath, Goldberg & Meyer; Richard C. Litman

(57) ABSTRACT

A method for obtaining an aqueous extract of *Clitoria ternatea* flowers, as well as the aqueous extract itself, are provided. The aqueous extract can be used for promoting growth of *Achillea* sp. grown under saline conditions.

4 Claims, No Drawings

PROMOTING GROWTH, YIELD, AND SALINITY TOLERANCE OF ACHILLEA FRAGRANTISSIMA

BACKGROUND

1. Field

The disclosure of the present patent application relates to promoting the growth, yield, and salinity tolerance of *Achillea fragrantissima*, and particularly to a method of using an aqueous extract of *Clitoria ternatea* flowers to promote the growth, yield, and salinity tolerance of *Achillea fragrantissima*.

2. Description of the Related Art

*Achillea fragrantissima* Forssk (Family: Asteraceae) is known as Qaisoum in the Arabian region and has been used as a tea-like infusion in traditional medicine to control high blood glucose levels. Antiviral, anti-neuroinflammatory, anticancer, antispasmodic, and antibacterial activities are also found in *A. fragrantissima*. Salinity, as an abiotic stress, continues to reduce agricultural yield and productivity. The damage induced by these stressors is responsible for massive economic losses all across the world. The growing salinization of agricultural land is expected to have global consequences.

Numerous elicitation studies have been conducted over the last decade to raise various phytochemical components of diverse plant species, using both biotic and abiotic elicitors. Such efforts remain ongoing.

Thus, a product and method for improving plant growth in a saline environment solving the aforementioned problems is desired.

SUMMARY

An aqueous extract of *Clitoria ternatea* flowers can have a strong effect on the growth, yield, and effect of diluted seawater irrigated *Achillea fragrantissima*. Such aqueous extracts can increase the growth, yield, and effect on compounds in the *Achillea* plant, as well as increase the salinity tolerance thereof.

In an embodiment, the present subject matter relates to a method for obtaining an aqueous extract of *Clitoria ternatea* flowers, the method comprising: grinding *Clitoria terneata* flowers in cold water to obtain a paste; centrifuging the paste to obtain a clear supernatant; and adding water to the clear supernatant to obtain the aqueous extract of *Clitoria terneata* flowers having a desired concentration.

In another embodiment, the present subject matter relates to an aqueous extract of *Clitoria terneata* flowers prepared according to the methods described herein.

In a further embodiment, the present subject matter relates to a method of promoting growth of *Achillea* sp. grown under saline conditions, the method comprising administering an aqueous extract of *Clitoria terneata* flowers as described herein to the *Achillea* sp. grown under saline conditions.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method for obtaining an aqueous extract of *Clitoria ternatea* flowers, the method comprising: grinding *Clitoria ternatea* flowers in cold water to obtain a paste; centrifuging the paste to obtain a clear supernatant; and adding water to the clear supernatant to obtain the aqueous extract of *Clitoria ternatea* flowers having a desired concentration.

In one embodiment, the grinding step of the present methods can be conducted using a mortar and pestle. By way of non-limiting example, the grinding step can be conducted for at least about 1 minute, and can be conducted in about 50 mL of cold water. As used herein, cold water can mean water having a temperature of above freezing and below 10° C., or a temperature of about 4° C.

In another embodiment, the centrifuging step can be conducted in a chilled centrifuge at about 7500 g to about 8500 g, at about 7500 g, at about 7600 g, at about 7700 g, at about 7800 g, at about 7900 g, at about 8000 g, at about 8100 g, at about 8200 g, at about 8300 g, at about 8400 g, at about 8500 g, or at about 8000 g. In another embodiment, the centrifuging step can be conducted for at least about 10 minutes.

In a further embodiment, the desired concentration of the aqueous extract of *Clitoria ternatea* flowers is about 0.5 g/L to about 1 g/L, about 0.5 g/L, or about 1 g/L.

In one embodiment, the aqueous extract of *Clitoria ternatea* flowers can comprise *Clitoria ternatea* flowers powder.

In another embodiment, the present subject matter relates to an aqueous extract of *Clitoria ternatea* flowers prepared according to the methods described herein. In this regard, the aqueous extract can comprise *Clitoria ternatea* flowers powder.

In an embodiment, the aqueous extract of *Clitoria ternatea* flowers can comprise one or more essential oils selected from the group consisting of thymine, 2,3-dihydro-3,5-dihydroxy-6-methyl-4H-Pyran-4-one, 1-methyl-Hydrouracil, Capric acid, DL-Pyroglutamic acid, Methyl dodecanoate, Lauric Acid, Nonanedioic acid dimethyl ester, Ethyl dodecanoate, tetrahydro-2-methyl-Thiophene, Methyl tetradecanoate, Myristic Acid, Ethyl palmitate, 6,10-dimethyl-Undecanone, Methyl palmitate, Phenylacetone oxime, Palmitic Acid, Hexadecanoic acid ethyl ester, N-Nitrosodimethylamine, alpha-Linoleic acid, Methyl oleate, Methyl petroselinate, Methyl Stearate, Elaidic Acid, Methyl octadec-9-ynoate, Ethyl oleate, 9-Tetradecenal, Ethyl stearate, Phytol, hexadecanal, Tridecanol, Eicosanoic acid methyl ester, amino-2-methylpyrimidin-4-ol, (R)-5-Dodecanolide, and Di-n-octyl ether.

In a further embodiment, the aqueous extract of *Clitoria terneata* flowers can comprise thymine, 2,3-dihydro-3,5-dihydroxy-6-methyl-4H-Pyran-4-one, 1-methyl-Hydrouracil, Capric acid, DL-Pyroglutamic acid, Methyl dodecanoate, Lauric Acid, Nonanedioic acid dimethyl ester, Ethyl dodecanoate, tetrahydro-2-methyl-Thiophene, Methyl tetradecanoate, Myristic Acid, Ethyl palmitate, 6,10-dimethyl-Undecanone, Methyl palmitate, Phenylacetone oxime, Palmitic Acid, Hexadecanoic acid ethyl ester, N-Nitrosodimethylamine, alpha-Linoleic acid, Methyl oleate, Methyl petroselinate, Methyl Stearate, Elaidic Acid, Methyl octadec-9-ynoate, Ethyl oleate, 9-Tetradecenal, Ethyl stearate, Phytol, hexadecanal, Tridecanol, Eicosanoic acid methyl ester, amino-2-methylpyrimidin-4-ol, (R)-5-Dodecanolide, and Di-n-octyl ether.

In another embodiment, the aqueous extract of *Clitoria terneata* flowers can comprise one or more components selected from the group consisting of Calcium, Copper, Iron, Magnesium, Phosphorus, Potassium, Zinc, Protein, Fat, Carbohydrate, Vitamin A, Vitamin B1, Vitamin B2, Vitamin B3, and Vitamin C.

In an embodiment, the aqueous extract of *Clitoria terneata* flowers can comprise Calcium, Copper, Iron, Magnesium, Phosphorus, Potassium, Zinc, Fat, Vitamin A, Vitamin B1, Vitamin B2, Vitamin B3, and Vitamin C.

In a further embodiment, the present subject matter relates to a method of promoting growth of *Achillea* sp. grown under saline conditions, the method comprising administering an aqueous extract of *Clitoria terneata* flowers as described herein to the *Achillea* sp. grown under saline conditions.

In one embodiment, the *Achillea* sp. can be selected from the group consisting of *Achillea fragrantissima* and *Achillea millefolium* L.

In another embodiment, the aqueous extract of *Clitoria terneata* flowers can be included in salt water or a salt mixture administered to the *Achillea* sp. In this regard, the aqueous extract of *Clitoria terneata* flowers can be administered to the *Achillea* sp. during multiplication and rooting stages.

In a further embodiment, the growth promoted can be one or more of an increased plant height, an increased plant weight, and an increased number of plant shoots.

The present subject matter may be further understood by referring to the following examples.

EXAMPLES

Example 1

Preparation of *Clitoria ternatea* flowers aquatic extract *Clitoria ternatea* flowers were purchased from Earth Circle Organics (USA). *Clitoria ternatea* flowers (0.5 and 1 g) were separately ground in a mortar and pestle for 1 minute in 50 mL of cold (4° C.) deionized water. The paste made from the *Clitoria ternatea* flowers was then centrifuged in a chilled centrifuge for 10 min. at 8000 g. The clear supernatant from each preparation (0.5 and 1 g) was collected into two separate volumetric flasks (1 L). Cold distilled water was used to top off each flask's volume to 1 L in order to obtain the corresponding *Clitoria ternatea* flowers at concentrations of 0.5 and 1 g/L.

Example 2

Analysis of the *Clitoria ternatea* Flowers Compositions

Components present in powder from the *Clitoria ternatea* flowers were analyzed and identified using GCMS techniques. Fat, fiber, moisture, protein, starch, and ash % were evaluated in the *Clitoria ternatea* flowers powder using near-infrared spectroscopy (NIRS), as well as the vitamin and mineral composition thereof.

The composition of common compounds found in the methanolic *Clitoria ternatea* flowers extracts Using GCMS analysis can be seen in Table 1, below.

TABLE 1

| Essential oils compounds | RT, min | Area, % | Molecular Weight (g · mol − 1) | Molecular formula |
|---|---|---|---|---|
| Thymine | 9.338 | 0.02 | 126.11 | C5H6N2O2 |
| 4H-Pyran-4-one, 2,3-dihydro-3,5-dihydroxy-6-methyl- | 11.077 | 0.05 | 144.12 | C6H8O4 |
| Hydrouracil, 1-methyl- | 12.02 | 0.03 | 128.13 | C5H8N2O2 |
| Capric acid | 14.362 | 0.02 | 172.268 | C10H20O2 |
| DL-Pyroglutamic acid | 17.992 | 0.3 | 129.11 | C5H7NO3 |
| Methyl dodecanoate | 19.485 | 0.78 | 214.34 | C13H26O2 |
| Lauric Acid | 20.179 | 0.92 | 200.32 | C12H24O2 |
| Nonanedioic acid, dimethyl ester | 20.605 | 0.2 | 216.2741 | C11H20O4 |
| Ethyl dodecanoate | 20.774 | 0.49 | 228.37 | C14H28O2 |
| Thiophene, tetrahydro-2-methyl- | 21.931 | 2.87 | 102.198 | C5H10S |
| Methyl tetradecanoate | 23.894 | 0.8 | 242.40 | C15H30O2 |
| Myristic Acid | 25.023 | 0.49 | 228.37 | C14H28O2 |
| Ethyl palmitate | 26.282 | 0.32 | 284.484 | C18H36O2 |
| Undecanone, 6,10-dimethyl | 28.301 | 0.07 | 98.3449 | C13H26O |
| Methyl palmitate | 33.205 | 14.33 | 270.5 | C17H34O2 |
| Phenylacetone oxime | 34.667 | 0.1 | 149.19 | C9H11NO |
| Palmitic Acid | 36.005 | 9.67 | 256.42 | C16H32O2 |
| Hexadecanoic acid, ethyl ester | 38.749 | 3.25 | 284.4772 | C18H36O2 |
| N-Nitrosodimethylamine | 41.49 | 0.01 | 74.083 | C2H6N2O |
| alpha-Linoleic acid | 44.05 | 10.66 | 280.4 | C18H32O2 |
| Methyl oleate | 44.302 | 22.62 | 296.5 | C19H36O2 |
| Methyl petroselinate | 44.473 | 0.6 | 296.494 | C19 H36 O2 |
| Methyl Stearate | 45.091 | 4.3 | 298.5 | C19H38O2 |
| Elaidic Acid | 45.28 | 4.62 | 282.5 | C18H34O2 |
| Methyl octadec-9-ynoate | 45.737 | 2.57 | 294.5 | C19H34O2 |
| Ethyl oleate | 45.903 | 13.31 | 310.5 | C20H38O2 |
| 9-Tetradecenal | 46.047 | 0.85 | 210.36 | C14H26O |
| Ethyl stearate | 46.495 | 1.08 | 312.5 | C20H40O2 |
| Phytol | 47.395 | 1.62 | 296.5 | C20H40O |
| hexadecanal | 47.6 | 0.39 | 240.42 | C16H32O |
| Tridecanol | 48.134 | 0.37 | 200.36 | C13H28O |
| Eicosanoic acid, methyl ester | 49.325 | 0.46 | 326.557 | C21H42O2 |
| -amino-2-methyl-pyrimidin-4-ol | 49.425 | 0.58 | 125.13 | C5H7N3O |
| (R)-5-Dodecanolide | 49.559 | 1.03 | 198.3 | C12H22O2 |
| Di-n-octyl ether | 54.37 | 0.09 | 242.44 | C16H34O |

Similarly, the chemical composition of the *Clitoria ternatea* flowers extract can be seen in Table 2, below.

TABLE 2

| Calcium | 340 mg |
|---|---|
| Copper | 0.03 mg |
| Iron | 0.9 mg |
| Magnesium | 30 mg |
| Phosphorus | 90 mg |
| Potassium | 155 mg |

TABLE 2-continued

| Zinc | 0.2 mg |
|---|---|
| Protein | 0 g |
| Fat | 1.70 g |
| Carbohydrate | 0 g |
| Vitamin A | 7 mg |
| Vitamin B1 | 0.04 mg |
| Vitamin B2 | 0.1 mg |
| Vitamin B3 | 0.45 mg |
| Vitamin C | 200 mg |

Example 3

Experimental Results

Using in vitro culture techniques, the effects of *Clitoria ternatea* flowers aqueous extract on the growth of *Achillea millefolium* L plant under salinity stress was investigated. Various concentrations of aqueous extracts of *Clitoria ternatea* flowers (0.5 and 1 g/L) were added to a 1× Murashige and Skoog (MS) basal salt mixture as well as various dilutions of seawater (35.00 g/L) in order to provide the media with suitable salinity concentrations (2000 and 4000 ppm) during multiplication and rooting stages.

Specifically, the effect of sea water concentrations (ppm) and an aqueous extract of *Clitoria ternatea* flowers on plant height (cm), plant fresh weight (g), and number of shoot/explant of *Achillea millefolium* L after four weeks at the multiplication stage was studied.

Four weeks old in vitro cultured shoot tips of *Achillea millefolium* L with a height of (0.5 cm) from in vitro grown plants were cultured onto 200-mL jars (tissue culture lab Department of Biological Science, Faculty of Science, King Faisal University). These jars contained 60 mL of MS medium (Murashige & Skoog, 1962, Sigma Aldrich), which was supplemented with 2% (w/v) sucrose, 7.0 g/L agar, and 0.2 mg/L 6-benzylaminopurine (BAP; Sigma Aldrich). This medium was treated with varying concentrations of seawater (40000 ppm) to provide media with Control, 2000, and 4000 ppm and *Clitoria ternatea* flowers aquatic extract (0.5 and 1 g/L). The EC of the control, seawater-free media was 800 ppm. The medium was adjusted to a pH of 5-7, prior to autoclaving at 121° C. and 1.2-1.3 kg cm$^{-1}$ pressure for 20 min. The cultures were incubated at 22±2° C., 16 h photoperiod and light intensity of 4000 lux provided by fluorescent lamps (Phillips TLM 40W/33RS) for 4-week periods. After one month the flowing data were recorded as Plant height (cm), Plant fresh weight (g) and Number of shoots/explant (n)

The data obtained can be seen in Table 3, below.

TABLE 3

| *Clitoria ternatea* flowers aquatic extract (g/L) | Seawater levels (ppm) | Plant height (cm) | Plant fresh weight (g) | No. of shoots/explant (n) |
|---|---|---|---|---|
| 0 | Control | 1.95 bc | 1.85 bc | 51.25 b |
| 0 | 2000 | 2.75 a | 2.85 a | 73.5 a |
| 0 | 4000 | 1.7 c | 1.25 c | 38 bc |
| 0.5 | Control | 1.625 c | 1.8 bc | 66.5 a |
| 0.5 | 2000 | 1.8 c | 1.87 bc | 74 a |
| 0.5 | 4000 | 1.75 c | 1.6 bc | 48.25 bc |
| 1 | Control | 2.0 bc | 2.825 a | 76.25 a |
| 1 | 2000 | 2.625 ab | 2.275 ab | 49.25 b |
| 1 | 4000 | 2.25 abc | 1.825 bc | 34 c |

*Means followed by the same letter within a column are not significantly different at 0.05 level of probability according to L.S.D. test.

Table 4, below, provides further details of the study conditions.

TABLE 4

| Treatments | Clitoria ternatea flowers aquatic extract (g/L) | Seawater levels (ppm) |
| --- | --- | --- |
| 1 | 0 | Control |
| 2 | 0 | 2000 |
| 3 | 0 | 4000 |
| 4 | 0.5 | Control |
| 5 | 0.5 | 2000 |
| 6 | 0.5 | 4000 |
| 7 | 1 | Control |
| 8 | 1 | 2000 |
| 9 | 1 | 4000 |

According to the data in Table 3, increasing the salt levels to 200 ppm significantly improved the plant height of explants, whereas increasing the salinity levels to 4000 ppm lowered the plant height of explants. This decrease is not significant (because both control and 4000 ppm have the same letter c in static analysis).

As the saline levels on the media increased, the plant height, plant fresh weight, and number of shoots per explants of Achillea millefolium L decreased. A 1 g/L aqueous extract of Clitoria ternatea flowers improved Achillea millefolium L growth compared to a 0.5 g/L control. Further, under salinity conditions, the 1 g/L aqueous extract of Clitoria ternatea flowers improved Achillea millefolium L growth compared to the control and 0.5 g/L.

As can be seen, these findings demonstrated that, in comparison to the control treatments, the aqueous extract of Clitoria ternatea flowers elicited secondary metabolites and Achillea millefolium L growth under salinity conditions.

It is to be understood that the method for promoting the growth, yield, and salinity tolerance of Achillea fragrantissima is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for obtaining an aqueous extract of Clitoria ternatea flowers, the method comprising:
    grinding Clitoria ternatea flowers in cold water to obtain a paste;
    centrifuging the paste to obtain a clear supernatant; and
    add water to the clear supernatant to obtain the aqueous extract of Clitoria ternatea flowers having a desired concentration,
    wherein the centrifuging step is conducted in a chilled centrifuge at about 7500 g to about 8500 g.

2. The method of claim 1, wherein the grinding step is conducted using a mortar and pestle.

3. The method of claim 1, wherein the desired concentration is about 0.5 g/L to about 1 g/L.

4. The method of claim 1, wherein the aqueous extract of Clitoria ternatea flowers comprises Clitoria ternatea flowers powder.

* * * * *